STIMULATED EMISSION OF RADIATION IN SEMICONDUCTOR DEVICES

Filed Oct. 15, 1962

INVENTORS
GERALD BURNS
FREDERICK H. DILL
WILLIAM P. DUMKE
GORDON J. LASHER
MARSHALL I. NATHAN

BY Alvin J. Riddles
ATTORNEY

3,265,990
STIMULATED EMISSION OF RADIATION IN SEMICONDUCTOR DEVICES

Gerald Burns, Peekskill, Frederick H. Dill, Putnam Valley, William P. Dumke, Chappaqua, Gordon J. Lasher, Briarcliff Manor, and Marshall I. Nathan, Mount Kisco, N.Y., assignors to International Business Machines Corporation, New York, N.Y., a corporation of New York
Filed Oct. 15, 1962, Ser. No. 230,607
13 Claims. (Cl. 331—94.5)

This invention relates to solid state devices; and, in particular, to the stimulated emission of radiation by carrier injection and recombination in a solid state element.

Radiation of light, as a result of the recombination of carriers within a semiconductor material has been observed in the semiconductor material gallium arsenide.

It has been discovered that recombination radiation associated with carrier injection into a solid state material having an energy gap will be stimulated emission when a sufficient current density of carriers is injected and thereby an optical maser with injection pumping is provided. Where the solid state material having an energy gap is a semiconductor material, any injecting connection such as a "p-n" junction will serve to introduce the carriers.

Optical masers or lasers, as the art has developed, generally involve the establishment of an artificial distribution of electrons at energy levels other than the natural distribution in a host environment through the application of a source of energy known as the "pumping energy." This results in a greater fraction of filled energy states at the higher levels than filled energy states at lower levels. This is known as a population inversion. The electrons present in the host environment in the artificial distribution then give up their energy and undergo a transition to a lower energy level. The released energy may be in the form of electromagnetic radiation; which, in the majority of devices seen thus far in the art, has been light, either in the visible or infrared.

In optical maser devices currently available in the art, there is employed either a gas; such as a helium-neon mixture; or, a crystal, such as aluminum oxide or calcium fluoride, as the host environment into which is placed appropriate impurities which respond to the pumping energy, permitting the population inversion of electrons between an excited state and a lower state of the impurity. The electrons in returning to the lower state of the impurity give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available optical maser devices, electrical power is converted to optical power, pumping light or an electrical discharge; which, in turn, is used to establish the population inversion.

It would appear that the establishment of the population inversion could be greatly simplified through injection of carriers into a solid state material having an energy gap such as through the use of a semiconductor "p-n" junction in that the pumping may then be done directly by electrical means without first converting to light energy or an electrical discharge. In a forward biased, "p-n" junction, carriers from one extrinsic conductivity type, upon crossing the "p-n" junction, are in an environment such that a radiative transition may take place when such carriers recombine. However, in practice, the various loss mechanisms associated with a solid state environment have operated to prevent stimulated emission of radiation from being realized.

It has been discovered, in accordance with the invention, that optical maser action or stimulated emission of radiation can be imparted to a suitable solid state material by injecting carriers at a sufficient rate and permitting those carriers to recombine. When this injected carrier rate is achieved, stimulated emission of radiation from the solid state material and a resulting narrowing of the emission line will occur.

The following references and material cited therein describe some of the background and physical principles involved in the devices under discussion and an insight, to some degree, of application of those principles in the present state of the art:

"Infrared and Optical Masers," by A. L. Schawlow and C. H. Townes in Physical Review, vol. 112, No. 6, December 15, 1958, pp. 1940–1949.

"Recombination Radiation Emitted by Gallium Arsenide," by R. J. Keyes and T. M. Quist in Proceedings of the IRE, vol. 50, No. 8, August 1962, p. 1822.

"Injection Luminescence from Gallium Arsenide," by J. I. Pankove and M. J. Massoulié in Bulletin of the American Physical Society, vol. 7, January 1962, p. 88.

"A Light Source Modulated at Microwave Frequencies," by J. I. Pankove and J. E. Berkeyheiser in Proceedings of the IRE, vol. 50, No, 9, September 1962, pp. 1976–1977.

"Interband Transitions and Maser Action," by W. P. Dumke in Physical Review, vol, 127, No. 5, September 1, 1962, pp. 1559–1563.

It is an object of this invention to provide stimulated emission of radiation in a solid state device.

It is another object of this invention to provide a coherent light emitting solid state structure.

It is another object of this invention to provide a solid state structure emitting light in a preferred optical mode.

It is another object of this invention to provide a method of manufacturing stimulated radiation emission semiconductor devices.

It is another object of this invention to provide stimulated emission of radiation independent of geometrical mode selection.

It is another object of this invention to provide an injection laser.

It is another object of this invention to provide a solid state device converting electrical energy directly to light energy and exhibiting a sharp narrowing of the emission line width for injected carrier density values in excess of a threshold density.

It is another object of this invention to provide stimulated emission of radiation in a semiconductor device.

It is another object of this invention to provide a coherent light emitting semiconductor structure.

It is another object of this invention to provide a semiconductor structure emitting light in a preferred optical mode.

It is another object of this invention to provide a coherent light emitting zinc doped diffused junction gallium arsenide diode.

The foregoing and other objects, features and advantages of the invention will be apparent from the following more particular description of a preferred embodiment of the invention, as illustrated in the accompanying drawings.

Figure 6:
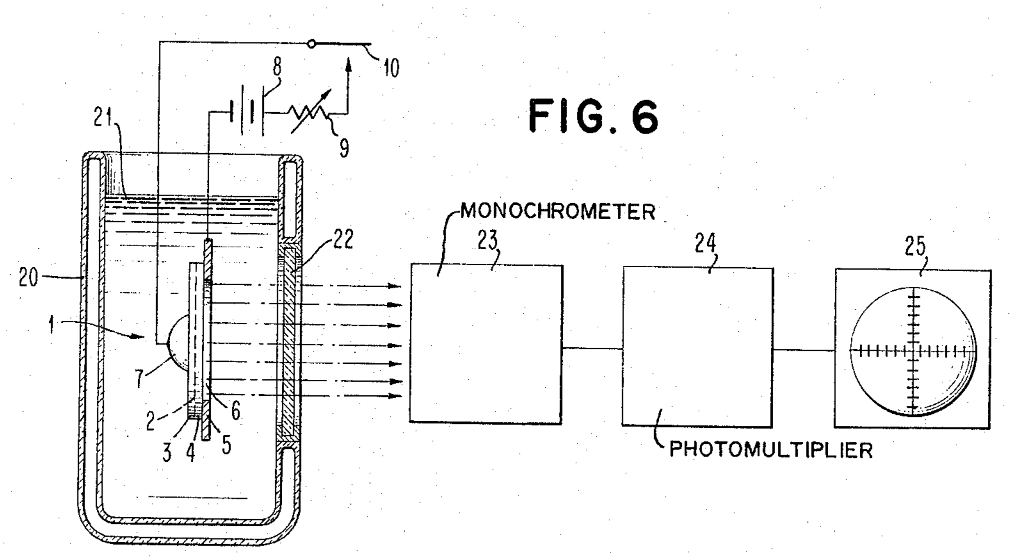

FIG. 6 describes an apparatus employed in examining the stimulated emission of radiation in accordance with the invention.

In accordance with the invention, stimulated emission of radiation may be imparted to a solid state material having an energy gap and exhibiting a radiative energy transition upon release of energy by carrier recombination therein by injecting carriers into the solid state material in a density sufficient to overcome the losses in the solid state environment.

When carriers are injected into a suitable solid state environment in sufficient density to overcome losses, stimulated emission of radiation will result. In order to satisfy the requirements of the invention, the material must have an energy gap. As will be further discussed, there are a number of other considerations relating to relative magnitudes of inherent losses in the medium. These losses and the general principles of the invention will be set forth by using as an example a "p-n" junction as the carrier injecting element in a semiconductor serving as a solid state body having a gap width; although, it will be apparent to one skilled in the art that carrier injection may be accomplished through other means such as the magnetic rectifier structure or a contact between a semiconductor and a suitable metal.

In accordance with a preferred embodiment of the invention, a stimulated emission of radiation may be imparted to a semiconductor device by the fabrication of a "p-n" junction in the device, appropriately forward biasing the "p-n" junction at an injected carrier current density sufficiently high to overcome various non-radiative electron recombination and various radiation loss mechanisms in the host semiconductor crystal. When these conditions are satisfied, the light output, as a result of the released energy through recombination of the injected carriers, sharply shifts to a single predominating mode at the expense of all other output modes in the system.

Figure 1:
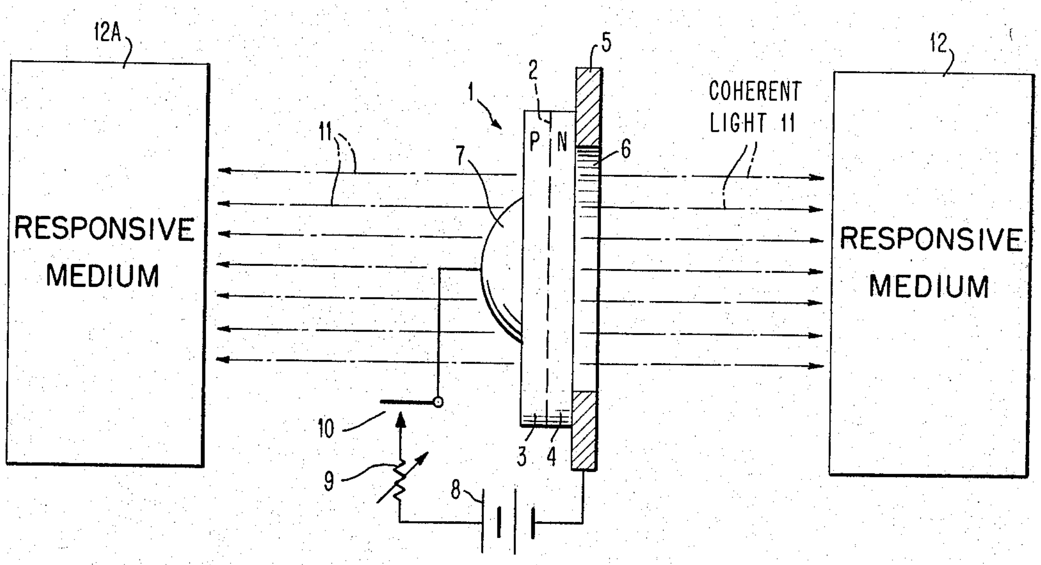
FIG. 1 is a stimulated radiation emission device constructed in accordance with the invention.

Referring now to FIG. 1, a "p-n" junction injection semiconductor embodiment of the device of the invention is illustrated emitting coherent light. The device of FIG. 1 is made up of a semiconductor crystal 1 containing a "p-n" junction 2, separating a "p" region 3 and an "n" region 4. The device is constructed having the "p-n" junction essentially parallel to a major surface area thereof. An apertured ohmic contact 5 is applied to the "n" region with the aperture 6 serving as an opening to permit light to be radiated from the "n" region 4. An ohmic contact 7 is applied to the "p" region and the ohmic contacts 5 and 7 are appropriately connected, to a power source, illustrated as a battery 8; a series variable impedance 9; and a switch 10; which serve to interruptably forward bias the "p-n" junction 2 above a selectable threshold current density.

Under these conditions, above a critical value of injected current density, coherent light, schematically illustrated as arrows 11, radiates from the surface of the "n" region 4 through the aperture 6 and around the ohmic contact 7 from the "p" region. Responsive media 12 and 12A are provided to permit one skilled in the art to observe and to utilize the coherent light 11. At present, coherent light may be modulated at high speeds; and, is valuable for communication and sharp focusing purposes. Where the light output is in the infrared, dark photography has been practiced. The art involving coherent light is rapidly developing and its nature and uses are receiving intensive study.

It will be apparent to one skilled in the art that the structure of the invention is greatly simplified and that only items essential to the operation are shown; but, that, in the light of the principles described herein, many structures will be apparent to one skilled in the art.

It should be particularly noted that, in accordance with the invention, a principle is set forth capable of producing coherent light independent of geometrical mode selection. However, as will be further discussed in greater detail, the geometry of the device 1 may be employed to enhance the optical properties of the device; and, thereby to reduce the actual requirement on the injected carrier current density across the "p-n" junction.

Figure 2:
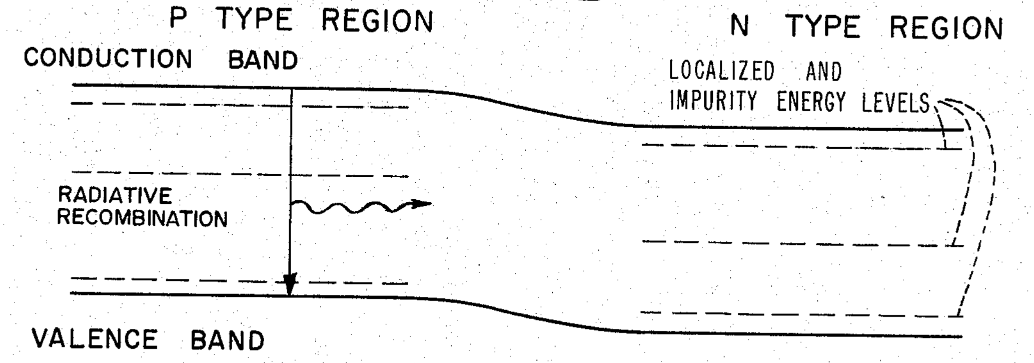
FIG. 2 is a graphical representation of the energy band relationship across a "p-n" junction in a semiconductor device.

The carrier injection principle as embodied using a "p-n" junction as the injector, may be more closely observed in connection with FIG. 2 which illustrates the energy band relationship within a particular conductivity type example semi-conductor material.

In FIG. 2, a "p" type region and an "n" type region corresponding to regions 3 and 4 of the crystal of FIG. 1 are separated by a forward biased "p–n" junction.

In operation, carriers are injected across the "p–n" junction. These carriers then are at a high energy level and are capable of releasing energy in a variety of ways, some of which may be radiative type energy transitions. Various localized and impurity energy levels on both sides of the junction are illustrated as dotted lines. The injected carrier may recombine with a carrier of the opposite sign in the other band either from the band or from a localized energy level into which it has fallen. Where the energy released is radiative, a light output from the crystal will be observed.

The environmental semiconductor crystal itself may have several characteristics that may operate to enhance or to retard stimulated emission. The characteristics have been found to be interdependent and frequently adverse effects due to one crystal environment characteristic may be overcome by a more pronounced enhancement effect by others. The following description of the more important environmental crystal characteristics is set forth to enable one skilled in the art to select from the wide range of semiconductor crystals those possessing the requisite interdependent characteristics that when employed, in accordance with the invention, a higher efficiency device will be achieved.

It is considered that where the crystal exhibits long carrier lifetime for non-radiative recombination, stimulated emission will be enhanced and the population inversion, essential to stimulated emission, will be easier to achieve. Lifetimes in semiconductor crystals vary by orders of magnitude and those possessing the longer non-radiative lifetimes are preferable.

Operation at low temperatures will help to produce a population inversion and assist stimulated emission by distributing the carriers over a narrower energy range and thereby over fewer possible energy levels.

Stimulated emission by injection in a semiconductor crystal will also be enhanced when the light given off in the radiative transition involves an energy transition that is below the band gap.

Referring to FIG. 2, this would mean that the injected carrier would undergo an energy transition less than the energy separation between the valence and conduction bands. Where the radiative energy released by the carrier is equal to or greater than the band gap separation, such released energy can be absorbed by exciting another electron into the conduction band. This electron then, in turn, has a probability for non-radiative recombination.

Another loss mechanism for radiative energy in the crystal detrimental to stimulated emission is given by free carrier absorption. In order to minimize this undesirable but inherent loss mechanism, it is preferable that a material be used which has a high probability for radiative recombination. In materials with a high radiative recombination probability, the probability of stimulated emission will also be high and this will result in a higher stimulated emission rate, which will overcome free carrier absorption. This requires that a preferable crystal have a band structure with a direct band gap. Materials which have an indirect band gap, such as silicon, and which require phonon assistance to conserve momentum in the radiative recombination process appear to be less suitable material choices.

The above described environmental characteristics operate to insure that a population inversion in the crystal can be achieved and that the radiation produced by such a population inversion will not be lost in the crystal.

As examples, the materials gallium arsenide; gallium antimonide; indium phosphide; indium antimonide; indium arsenide; and alloys of gallium arsenide-gallium phosphide containing less than fifty percent of gallium phosphide have a high radiative recombination probability and therefore would make suitable substances in which stimulated emission would occur.

In accordance with the invention, when the density of injected carriers across a junction as shown in FIG. 2 is sufficient to satisfy the threshold requirement, stimulated emission will occur and the light output emission line will become very narrow and very intense.

It will be apparent to one skilled in the art that the parameters involved in the achievement of stimulated emission of radiation by carrier injection in a semiconductor crystal are extremely interdependent and that, in addition to having favorable environmental crystal characteristics, device geometry improvements directed to increased injection efficiency favoring a particular region for recombination and to optical resonance will somewhat relax the injected carrier density requirement.

Figure 3:
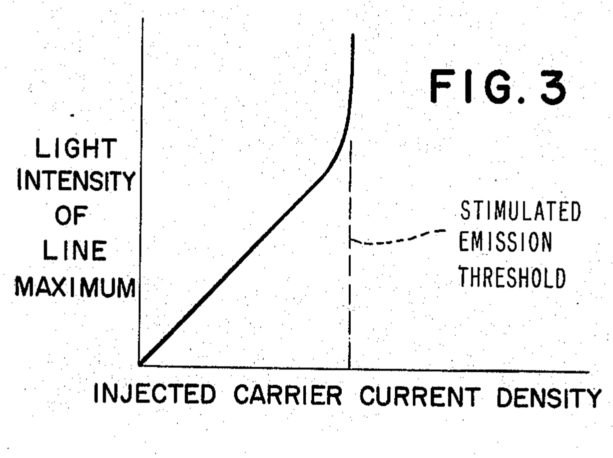
FIG. 3 is a curve of light intensity of line maximum versus injected carrier current density in the device of the invention illustrating the stimulated emission threshold.

Referring next to FIG. 3, in accordance with the invention, the threshold of injected carrier current density is illustrated. In the curve of FIG. 3, light intensity of line maximum is plotted versus injected carrier current density. At a threshold value of injected carrier current density, there is an abrupt shift in light intensity to a narrow band of intense light and with further current increases this narrow band predominates at the expense of other bands. The critical injected carrier current density threshold serves as a triggering mechanism for stimulated emission within the material and beyond this point as the injected carrier current density increases, the light output is substantially confined to a fairly narrow band of intense light.

Figure 4:
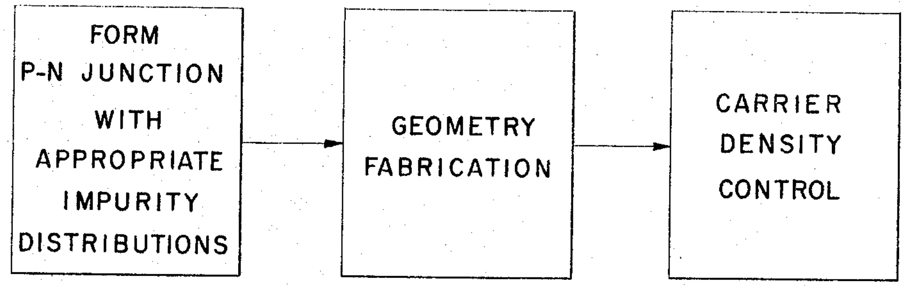
FIG. 4 is a flow chart showing steps involved in fabrication in accordance with the invention.

Referring next to FIG. 4, a flow chart is shown illustrating the fabrication of semiconductor devices in accordance with the invention. In a first step, a semiconductor host crystal, preferably having favorable environmental characteristics is provided with a "p–n" junction, such as by the diffusion of conductivity type determining impurities into the device, such that the net quantity of one conductivity type determining impurity over the other defines two regions of extrinsic conductivity type separated by a "p–n" junction.

Since the injection efficiency of a "p-n" junction; the fields associated therewith under bias; and, the series resistance of the ultimate device are governed by the impurity concentration and distribution in the crystal in which the "p-n" junction is located, it will be necessary that the impurity distribution in the crystal be carefully controlled. For example, for low series resistance, it is desirable to have a high impurity concentration, but the impurity density is also known to have a marked effect on the lifetime of the crystal discussed above as one of the environmental characteristics, thus appropriate selection of impurity density is essential. It will be apparent however, that one skilled in the art with the available literature before him can readily select the appropriate junction formation process and desirable impurity distribution in the practice of the invention.

The second step is directed to the fabrication of the device and the appropriate geometry. The device of FIG. 1 illustrates a broad area "p-n" junction having the junction parallel to the major surface.

It will be apparent to one skilled in the art that where a critical parameter is the injected carrier density, that a correlation will be required between the current available and the cross-sectional area of the junction. As a result of this correlation, the physical size of the junction is either controlled in fabrication or altered as by etching after it is completed.

Since electromagnetic modes are involved, the internal crystal distance and optical parallelism within the crystal should be so spatially arranged that optical resonance can take place and thereby sharp enhancement of the output and corresponding relaxation of the carrier injection threshold requirement could be realized. Similarly, other geometry gains may be realized by selection of the optical transmission of the semiconductor host crystal and the physical thickness of the crystal from the region wherein the radiative transition occurs to the surface where it may be utilized.

The third step in the chart of FIG. 4 requires operation above the threshold density of carriers injected at the junction. It has been found that when the injected carrier density reaches a certain critical value dependent on the losses in the system, that the various loss mechanisms within the crystal are overcome and the sharp coherent light output is achieved in accordance with the invention. This carrier density control may be generally expressed in terms of a given amount of current applied through a particular cross-sectional area of the junction. A number of detailed illustrative examples will be provided herewith to permit one skilled in the art to correlate between the many parameters such as the various types of semiconductor materials, the particular dopants, their concentrations and distributions, and the geometry such as the cross-sectional area of the junction related to the current density.

What has been described in connection with FIG. 4 is a general process setting forth the areas for attention in order to achieve stimulated emission of radiation in a semiconductor medium by carrier injection. It will be apparent that the steps involving the formation of the "p-n" junction and the geometry as the technology advances may become inter-related since through the techniques of diffusion, vapor growth and conductivity type conversion, the formation of a "p-n"' 'junction in a specific geometry is becoming standard practice in the semiconductor art.

Further, it will be apparent, in view of the intense activity in the stimulated emission of radiation field, that various geometries more valuable than those known at present will appear.

The process of FIG. 4 sets forth the control of the formation of the "p-n" junction coupled with that of the geometry of the semiconductor environmental crystal and when this is accomplished, the operation of that crystal under the carrier current density threshold, in order to achieve stimulated emission of radiation by carrier injection in a crystal.

Figure 5:
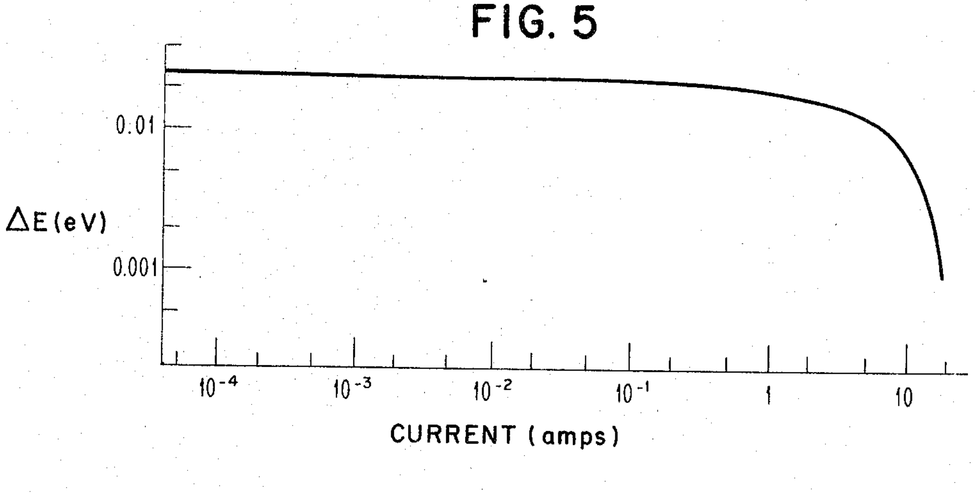
FIG. 5 is a curve illustrating the narrowing of the band width of light output versus current.

Referring next to FIGS. 5 and 6, a typical example of a semiconductor embodiment of the device of the invention is provided employing as an injection element a "p-n" junction. FIG. 5 shows the emission line width at half height, labelled ΔE versus Current. The actual device is illustrated in FIG. 1 and shown also in FIG. 6 in connection with measurement apparatus. A gallium arsenide body 1 contains an "n" region 4 doped with tellurium and a diffused junction 2 between the "n" region 4 and the "p" region 3 formed by diffusing zinc into the gallium arsenide. The junction 2 is approximately 0.005 inch below the surface to which a gold plated Kovar washer 5 is attacehd. An indium ohmic contact 7 is applied to the opposite surface at the "p" region 3 and the total thickness of the wafer is approximately 0.007 inch. The junction 2 was etched to an area of approximately $1\times10^{-4}$ cm.². The diode 1 is immersed in liquid nitrogen 21 in a container 20 and is driven with currents, as shown in the scale in connection with FIG. 5, for durations on the order of $50\times10^{-9}$ seconds. At low injection levels it is observed that more than ninety-five percent of the light is emitted in a line at 1.47 ev.; with an approximate width at half maximum at 0.026 ev. As the injected carrier density was increased, the line width decreases, at first only slightly, but at currents of the order of $10^4$ to $10^5$ amps per cm.², a stimulated emission threshold of carrier injection was achieved, as shown in FIG. 5, with the resultant abrupt narrowing of the emission line.

The current was varied by varying the impedance of resistance 9 over a wide range. The line of narrowing width of this particular example measured between half intensity points for current is as follows:

| | Angstroms |
|---|---|
| 3 amperes | 95 |
| 10 amperes | 41 |
| 15 amperes | 9 |

and, at 21 amperes, the line is separated into two lines separated by 6 Angstroms and approximately 2 Angstroms wide. The quantum efficiency, which is light output divided by current input, in the line narrowing region is constant and this is some evidence that the ultimate quantum efficiency of these diodes will approach one hundred percent.

The light is transmitted through the window 22 to a monochrometer 23 and a photomultiplier 24 which converts the signal to an electrical signal for observation in a cathode ray oscilloscope 25.

In order to enable one skilled in the art to have a starting place to practice the invention in a technology such as the one under discussion, where many different parameters are involved, the following tables of actual examples are provided, it being understood that no limitation should be construed hereby for in the light of the principles of the invention herein set forth, a wide range of specific devices and conditions will be readily apparent.

*Performance*

| Device Number | Temperature | Current (Amps.) | Light Emission Frequency (in A.) | Stimulated Emission | | Light Output, Relative Intensity | ×10⁴ Current Density (Amps./Cm.²) |
|---|---|---|---|---|---|---|---|
| | | | | Number of Lines | Width (in A.) | | |
| 17-19-12 | 77° K.<br>↓ | 4<br>8<br>12<br>16<br>20<br>24<br>28 | 8400A<br>8401<br>8399<br>8404<br>8405<br>8410<br>8417 | 1<br>↓ | 73<br>52<br>38<br>30<br>24<br>23<br>28 | 60<br>↓ | 6<br>12<br>18<br>24<br>30<br>36<br>42 |
| 17-19-13 | 77° K.<br>↓ | 2<br>4<br>8<br>12<br>16<br>20<br>24<br>28 | 8405<br>8400<br>8401<br>8403<br>8348<br>8343<br>8393<br>8402 | 1<br>↓ | 97<br>79<br>65<br>57<br>60<br>57<br>45<br>52 | 40<br>↓ | 3<br>6<br>12<br>18<br>24<br>30<br>36<br>42 |
| 17-19-14 | 77° K.<br>↓ | 2<br>4<br>8<br>12<br>16<br>20<br>24 | 8415<br>8415<br>8397<br>8397<br>8399<br>8403<br>8403 | 1<br>↓ | 75<br>79<br>70<br>50<br>41<br>45<br>45 | 55<br>↓ | 3<br>6<br>12<br>18<br>24<br>30<br>36 |
| 17-19-15 | 77° K.<br>↓ | 2<br>4<br>8<br>12<br>16<br>20<br>24<br>28 | 8399<br>8393<br>8391<br>8400<br>8380<br>8397<br>8398<br>8398 | 1<br>↓ | 75<br>74<br>72<br>57<br>57<br>52<br>52<br>55 | 45<br>↓ | 3<br>6<br>12<br>18<br>24<br>30<br>36<br>42 |
| 17-19-24 | 25° C.<br>↓ | 2<br>4<br>8<br>12<br>16<br>20<br>24<br>28<br>32<br>36 | Not measured | 1<br>↓ | ≈220<br>≈220<br>214<br>214<br>220<br>240<br>230<br>178<br>191<br>190<br>180 | Not measured | Not Measured |
| 17-19-23 | 25° C.<br>↓ | 6<br>12<br>20<br>24<br>28 | Not measured | 1<br>↓ | 195<br>215<br>184<br>184<br>196 | 80<br>↓ | 3<br>6<br>10<br>12<br>14 |
| 17-18-26 | 77° K.<br>→ | 2<br>4<br>8<br>12<br>16<br>20<br>24<br>28<br>32<br>36<br>40 | 8418<br>8415<br>8412<br>8410<br>8411<br>8416<br>8416<br>8416<br>8417<br>8420<br>8418 | 1<br>↓ | 140<br>120<br>95<br>71<br>62<br>45<br>37<br>31<br>32<br>28<br>28 | 135<br>↓ | 2<br>4<br>8<br>12<br>16<br>20<br>24<br>28<br>32<br>36<br>40 |
| 17-18-25 | 77° K.<br>↓ | 2<br>8<br>16<br>24 | 8415<br>8413<br>8413<br>8414 | Not measured | 105<br>97<br>91<br>76 | 100<br>↓ | 1.3<br>5.2<br>10<br>15 |

*Performance*

<table>
<tr><th rowspan="2">Device Number</th><th rowspan="2">Temperature</th><th rowspan="2">Current (Amps.)</th><th rowspan="2">Light Emission Frequency (in A.)</th><th colspan="2">Stimulated Emission</th><th rowspan="2">Light Output, Relative Intensity</th><th rowspan="2">×10^4 Current Density (Amps./Cm.^2)</th></tr>
<tr><th>Number of Lines</th><th>Width (in A.)</th></tr>
<tr><td>17-17-24</td><td>77° K.<br>↓<br>73.5<br>↓<br>72<br>↓</td><td>16<br>24<br>16<br>24<br>16<br>28</td><td>8443<br>8423<br>8457<br>8450<br>8425<br>8434<br>8417<br>8453<br>8445<br>8425<br>8432<br>8413<br>8455<br>8446<br>8423<br>8418</td><td>2<br>2<br>3<br>3<br>3<br>2<br>2<br>2<br>2<br>2<br>2<br>2<br>Not measured<br>Not measured<br>Not measured<br>Not measured</td><td>10A<br>12A<br>6A<br>≈6A<br>8A<br>≈6A<br>≈6A<br>6<br>≈8<br>8<br>8<br>8<br>≈10<br>10<br><br>≈5</td><td>185<br>↓</td><td>16<br>16<br>24<br>24<br>24<br>16<br>16<br>24<br>24<br>24<br>16<br>16<br>28<br>28<br>28<br>28</td></tr>
<tr><td>17-19-22</td><td>77° K.<br>↓</td><td>2<br>4<br>12<br>20<br>32<br>40</td><td>8414<br>8416<br>8414<br>8414<br>8415<br>8414</td><td>1<br>↓</td><td>120<br>100<br>75<br>67<br>62<br>53</td><td>135<br>↓</td><td>1.5<br>3.0<br>9<br>15<br>24<br>30</td></tr>
<tr><td>11785-51B</td><td>77° K.<br>↓</td><td>2<br>4<br>8<br>12<br>16<br>Not measured<br>Not measured<br>Not measured</td><td><br><br><br><br>8468<br>8446<br>8408<br>8363</td><td>Not measured<br>Not measured<br>Not measured<br><br>4<br>↓</td><td>90<br>54<br>62<br>48</td><td>Not measured</td><td>Not measured</td></tr>
<tr><td>17-19-33</td><td>77° K.<br>↓</td><td>4<br>12<br>20<br>28</td><td>8421<br>8414<br>8423<br>8422</td><td>1<br>↓</td><td>150<br>125<br>90<br>85</td><td>95<br>↓</td><td>0.5<br>1.5<br>2.5<br>3.5</td></tr>
<tr><td>17-19-34</td><td>77° K.<br>↓</td><td>4<br>16<br>24</td><td>8416<br>8415<br>8423</td><td>1<br>↓</td><td>124<br>103<br>62</td><td>95<br>↓</td><td>1.0<br>4<br>6</td></tr>
<tr><td>78-86-6</td><td>77° K.<br>↓</td><td>8<br>12<br>16<br>20<br>24</td><td>8423<br>8435<br>8435<br>8439<br>8446</td><td>1<br>↓</td><td>124<br>118<br>90<br>85<br>81</td><td>Not measured</td><td>Not measured</td></tr>
<tr><td>17-21-2</td><td>77° K.<br>↓</td><td>4<br>12<br>16<br>20<br>24<br>28</td><td>8410<br>8416<br>8415<br>8414<br>8414<br>8420</td><td>1<br>↓</td><td>102<br>56<br>51<br>53<br>45<br>42</td><td>108<br>↓</td><td>8<br>24<br>32<br>40<br>48<br>56</td></tr>
<tr><td>17-21-5</td><td>77° K.<br>↓</td><td>4<br>16<br>24</td><td>8420<br>8414<br>8414</td><td>1<br>↓</td><td>128<br>70<br>69</td><td>117<br>↓</td><td>6<br>24<br>36</td></tr>
<tr><td>17-21-9</td><td>77° K.<br>↓</td><td>2<br>4<br>8<br>12<br>14<br>16<br>20</td><td>8402<br>8408<br>8423<br>8438<br>8438<br>8438<br>8436</td><td>1<br>↓<br>Several</td><td>120<br>90<br>53<br>16<br>11<br>8</td><td>120<br>↓</td><td>6<br>12<br>24<br>36<br>42<br>48<br>60</td></tr>
<tr><td>17-21-11</td><td>77° K.<br>↓</td><td>4<br>12<br>20</td><td>8430<br>8413<br><br>8413</td><td>1<br>↓</td><td>111<br>90<br>68<br>68</td><td>180<br>↓</td><td>Not measured</td></tr>
<tr><td>17-19-38</td><td>77° K.<br>↓</td><td>4<br>16<br>24</td><td>8395<br>8402<br>8403</td><td>1<br>↓</td><td>105<br>110<br>87</td><td>135<br>↓</td><td>2<br>8<br>12</td></tr>
<tr><td>17-21-13</td><td>77° K.<br>↓</td><td>4<br>12<br>16</td><td>8408<br>8405<br>8410</td><td>1<br>↓</td><td>97<br>50<br>50</td><td>138<br>↓</td><td>10<br>30<br>40</td></tr>
<tr><td>17-19-28</td><td>77° K.<br>↓</td><td>2<br>8<br>16<br>20<br>28</td><td>8423<br>8414<br>8409<br>8410<br>8415</td><td>1<br>↓</td><td>100<br>94<br>75<br>68<br>70</td><td>14<br>↓</td><td>2<br>8<br>16<br>20<br>28</td></tr>
<tr><td>17-19-36</td><td>77° K.<br>↓</td><td>4<br>16<br>24</td><td>8415<br>8418<br>8422</td><td>1<br>↓</td><td>120<br>105<br>69</td><td>135<br>↓</td><td>3<br>12<br>18</td></tr>
<tr><td>17-18-33</td><td>77° K.</td><td>20A</td><td>8431</td><td>1</td><td>45</td><td>135</td><td>25</td></tr>
<tr><td>17-21-5</td><td>77° K.<br>↓</td><td>4<br>12<br>14</td><td>8413<br>8413<br>8413</td><td>1<br>↓</td><td>117<br>97<br>105</td><td>108<br>↓</td><td>6<br>18<br>21</td></tr>
<tr><td>17-21-8</td><td>77° K.<br>↓</td><td>4<br>8<br>16</td><td>8413<br>8413<br>8428</td><td>1<br>↓</td><td>145<br>134<br>125</td><td>129<br>↓</td><td>4<br>8<br>16</td></tr>
</table>

*Device data*

| Device Number | Crystal Information | | | | Structure Information | | | | | Contacts | |
|---|---|---|---|---|---|---|---|---|---|---|---|
| | Dopant | | Growth History | Material | (Pico Farad) Junction Area in Terms of Capacity | Junction Type | Diffusion Temperature | (Mils) Junction Depth | Time, hr./min. | "n" Region | "p" Region |
| | "p" Side | "n" Side | | | | | | | | | |
| 17-19-12 | Zn ↓ | Te ↓ | Quartz Container ↓ | 11, 770. 48 GaAs ↓ | 8 ↓ | Diffused ↓ | 916° C. ↓ | 0. 8 ↓ | 1:30 ↓ | AuSb plated Kovar Washer ↓ | 5 mil. In dot ↓ |
| 17-19-13 | Zn ↓ | Te ↓ | Quartz Container ↓ | 11, 770. 48 GaAs ↓ | 8 ↓ | Diffused ↓ | 916° C. ↓ | 0. 8 ↓ | 1:30 ↓ | AuSb plated Kovar Washer ↓ | 5 mil. In dot ↓ |
| 17-19-14 | Zn ↓ | Te ↓ | Quartz Container ↓ | 11, 770. 48 GaAs ↓ | 7. 3 ↓ | Diffused ↓ | 916° C. ↓ | 0. 8 ↓ | 1:30 ↓ | AuSb plated Kovar Washer ↓ | 5 mil. In dot ↓ |
| 17-19-15 | Zn ↓ | Te ↓ | Quartz Container ↓ | 11, 770. 48 GaAs ↓ | 8. 5 ↓ | Diffused ↓ | 916° C. ↓ | 0. 8 ↓ | 1:30 ↓ | AuSb plated Kovar Washer ↓ | 5 mil. In dot ↓ |
| 17-19-24 | Zn ↓ | Te ↓ | Quartz Container ↓ | 11,770,48 GaAs ↓ | Not measured | Diffused ↓ | 916° C. ↓ | 0.8 ↓ | 1:30 ↓ | AuSb plated Kovar Washer ↓ | 5 mil. In dot ↓ |
| 17-19-23 | Zn ↓ | Te ↓ | Quartz Container ↓ | 11,770.48 GaAs ↓ | 20 ↓ | Diffused ↓ | 916° C. ↓ | 0.8 ↓ | 1:30 ↓ | AuSb plated Kovar Washer ↓ | 5 mil. In dot ↓ |
| 17-18-26 | Zn ↓ | Te ↓ | Quartz Container ↓ | 11,770.48 GaAs ↓ | 13 ↓ | Diffused ↓ | 862° C. ↓ | ~2 ↓ | 16 ↓ | AuSb plated Kovar Washer ↓ | 5 mil. In dot ↓ |
| 17-18-25 | Zn ↓ | Te ↓ | Quartz Container ↓ | 11,770.48 GaAs ↓ | 20 ↓ | Diffused ↓ | 862° C. ↓ | ~2 ↓ | 16 ↓ | AuSb plated Kovar Washer ↓ | 5 mil. In dot ↓ |
| 17-18-24 | Zn ↓ | Te ↓ | Quartz Container ↓ | 11,770.48 GaAs ↓ | 13 ↓ | Diffused ↓ | 862° C. ↓ | ~2 ↓ | 16 ↓ | AuSb plated Kovar Washer ↓ | 5 mil. In dot ↓ |
| 17-19-22 | Zn ↓ | Te ↓ | Quartz Container ↓ | 11,770.48 GaAs ↓ | 17 ↓ | Diffused ↓ | 916° C. ↓ | 0.8 ↓ | 1:30 ↓ | AuSb plated Kovar Washer ↓ | 5 mil. In dot ↓ |

*Device data*

| Device Number | Crystal Information: Dopant "p" Side | Crystal Information: Dopant "n" Side | Crystal Information: Growth History | Crystal Information: Material | Structure Information: (Pico Farad) Junction Area in Terms of Capacity | Structure Information: Junction Type | Structure Information: Diffusion Temperature | Structure Information: (Mils) Junction Depth | Structure Information: Time, hr./min. | Contacts: "n" Region | Contacts: "p" Region |
|---|---|---|---|---|---|---|---|---|---|---|---|
| 11785-51B | Zn | Te | Quartz Container | GaAs | Not measured | Alloy | | Not measured | Not measured | Not measured | 5 mil. Sn dot |
| 17-19-33 | Zn | Te | Quartz Container | 11,770.48 GaAs | 115 | Diffused | 916° C. | 0.8 | 1:30 | AuSb plated Kovar Washer | Evaporated Au |
| 17-19-34 | Zn | Te | Quartz Container | 11,770.48 GaAs | 57 | Diffused | 916° C. | 0.8 | 1:30 | AuSb plated Kovar Washer | Evaporated Au |
| 78-86-6 | Cd | Te | Quarts Container | 11,770.48 GaAs | Not measured | Diffused | 914° C. | 0.7 | 72 | Sn solder Ni Washer | 5 mil. In GaAg |
| 17-21-2 | Zn | Te | Quartz Container | 11,770.50 GaAs | 6.2 | Diffused | 850° C. | $\sim$2 | 72 | AuSb plated Kovar Washer | 5 mil. In GaAg |
| 17-21-5 | Zn | Te | Quartz Container | 11,770.50 GaAs | 7.8 | Diffused | 850° C. | $\sim$2 | 72 | AuSb plated Kovar Washer | 5 mil. In GaAg |
| 17-21-9 | Zn | Te | Quartz Container | 11,770.50 GaAs | 3.7 | Diffused | 850° C. | $\sim$2 | 72 | AuSb plated Kovar Washer | 5 mil. In GaAg |
| 17-21-11 | Zn | Te | Quartz Container | 11,770.48 GaAs | Not measured | Diffused | 862° C. | Not measured | 16 | Au plated HoHg Washer | 5 mil. In GaAg |
| 17-19-38 | Zn | Te | Quartz Container | 4,900.11 GaAs | 23 | Diffused | 862° C. | $\sim$2 | 72 | AuSb Plated Kovar Washer | 5 mil. In GaAg |
| 17-21-13 | Zn | Te | Quartz Container | 11,770.48 GaAs | 5.6 | Diffused | 862° C. | 2 | 16 | AuSb plated Kovar Washer | 5 mil. In GaAg |
| 17-19-28 | Zn | Te | Quartz Container | 1,842.5 GaAs | 14.3 | Diffused | 862° C. | $\sim$2 | 72 | AuSb plated Kovar Wfflsher | 5 mil. In GaAg |
| 17-19-36 | Zn | Te | Quartz Container | 11,770.48 GaAs | 17 | Diffused | 916° C. | 0.8 | 1:30 | AuSb plated Kovar Washer | Evaporated Au |
| 17-18-33 | | Undoped | Quartz Container | 1,842.56 GaAs | 10.5 | Diffused | 860° C. | | 19 | AuSb plated Kovar Washer | 5 mil. In GaAg |
| 17-21-5 | Zn | Te | Quartz Container | 11,770.50 GaAs | 7.8 | Diffused | 850° C. | $\sim$2 | 72 | AuSb plated Kovar Washer | 5 mil. In GaAg |
| 17-21-8 | Zn | Te | Quartz Container | 11,770.50 GaAs | 14 | Diffused | 850° C. | $\sim$2 | 72 | AuSb plated Kovar Washer | 5 mil. In GaAg |

What has been described is a technique of providing stimulated emission of radiation in a solid state material having a band gap through the injection of a sufficient density of carriers for recombination therein, which is capable of compensating for the losses within the solid state material.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus exhibiting stimulated emission of radiation comprising:

a body of semiconductor material having a direct band gap and exhibiting a strong direct radiative transition in the vicinity of said band gap involving an energy less than that necessary to move a current carrier from the conduction band to the valence band; and means including a p-n junction in said body and current supply means coupled to said junction for forward biasing said junction to inject electrical current carriers into said body in excess of a threshold density to produce stimulated emission of radiation at said energy less than that necessary to move a current carrier from the conduction band to the valence band.

2. The apparatus of claim 1 wherein said semiconductor is gallium arsenide.

3. Apparatus exhibiting stimulated emission of radiation comprising:

a body having a direct band gap and being of a material exhibiting direct radiative transitions when electrical carriers recombine therein;

means for compensating for internal losses which tend to impede the onset of stimulated emission in said body of material comprising:

means including a forward biased p-n junction for injecting electrical carriers into said body in excess of a stimulated emission threshold density at a particular frequency, said frequency corresponding to an energy less than said band gap.

4. Apparatus exhibiting stimulated emission of radiation comprising:

a body of a material having a direct band gap and being capable of exhibiting direct radiative transitions when electrical carriers recombine therein; and, means for compensating for internal losses which tend to impede the onset of stimulated emission in said body of material;

said loss compensation means comprising at least one of said radiative transitions involving an energy transition less than said band gap, and means including a forward biased p-n junction for injecting electrical carriers into said body in excess of a threshold density to produce stimulated emission of radiation at said energy less than said band gap.

5. A solid state electrical energy to coherent light energy converting apparatus exhibiting stimulated emission of radiation comprising:

a body of material having a direct band gap and exhibiting radiative transitions when electrical carriers recombine therein; and, which exhibits a sharp increase in light intensity at a particular wavelength when greater than a particular density of injected electrical carriers is present;

and means including a forward biased p-n junction for injecting electrical carriers into said body in excess of a stimulated emission threshold density at said particular wavelength;

the energy of said light at said particular wavelength being less than said band gap.

6. A stimulated emission device comprising:

a body of semiconductor material having a direct band gap between a conduction band and a valence band;

and exhibiting a direct radiative transition by recombination of carriers therein involving an energy transition less than the energy separation between said valence and conduction bands;

and means including a forward biased p-n junction for injecting carriers into said body above a threshold value to produce stimulated emission of radiation at said energy less than the energy separation between said valence and conduction bands.

7. A stimulated emission device comprising:

a body of semiconductor material having a direct band gap between a conduction band and a valence band;

at least a portion of said body having an impurity therein to provide in at least said portion radiative transitions involving an energy transition less than the energy separation between said valence and conduction bands;

and means including an electric power source coupled to said body to bias said body above a threshold value to produce stimulated emission of radiation at said energy less than the energy separation between said valence and conduction bands.

8. The stimulated emission device of clam 7 wherein said semiconductor material is gallium arsenide.

9. The stimulated emission device of claim 7 wherein said body includes a p-n junction and said power source forward biases said junction to inject carriers in said body.

10. The stimulated emission device of claim 9 wherein said semiconductor material is gallium arsenide.

11. The stimulated emission device of claim 10 wherein said impurity is zinc.

12. A stimulated emission device comprising:

a body of semiconductor material having a direct band gap between a conduction band and a valence band;

said body having impurities therein to provide a p-n junction in said body and a high direct radiative transition probability in at least a portion of said body at an energy less than the energy separation between said valence and conduction bands;

and means coupled to said body to forward bias said p-n junction to provide sufficient carriers in said portion of said body to exceed a threshold necessary to produce stimulated emission of radiation at said energy less than said energy separation between said valence and conduction bands.

13. A stimulated emission device comprising:

a body of semiconductor material having a valence band and a conduction band and a direct energy gap between said valence and conduction bands;

at least a portion of said body having sufficient impurities therein to provide strong direct radiative transitions between first and second energy levels;

the separation between said first and second energy levels being less than the separation between the edges of said valence and conduction bands whereby the radiative energy given off as the result of a transition between said first and second levels is less than that which is necessary to transfer an electron from said valence to said conduction band;

and means including a forward biased p-n junction for injecting electrical carriers into at least said portion of said material above a threshold density to produce stimulated emission of radiation between said first and second energy levels.

References Cited by the Examiner

UNITED STATES PATENTS

| | | | |
|---|---|---|---|
| 3,059,117 | 10/1962 | Boyle et al. | 88—61 |
| 3,121,203 | 2/1964 | Heywang | 88—61 |

OTHER REFERENCES

Basov et al.: "Negative Absorption Coefficient at Indirect Transitions in Semiconductors," Advances in Quantum Electronics, J. Singer Ed., Columbia Univ. Press, 1961, pp. 496–506.

Benot et al.: "Les Semi-conducteurs et Leur Utilisation Possible Dans 'Les Lasers'," J. Physique et le Radium, vol. 22, No. 12, December 1961, pp. 834–836.

(Other references on following page)

OTHER REFERENCES

Bernard et al.: "Laser Conditions in Semi-conductors," Phyisca Status Solidi, vol. 1, pp. 699–703, 1961.

Bernard et al.: "Possibilites de Lasers a Semi-conducteurs," J. Physique et le Radium, vol. 22, No. 12, December 1961, pp. 836 and 837.

Dumke: "Interband Transitions and Maser Action," Physical Review, vol. 127, No. 5, Sept. 1, 1962, pp. 1559–1563.

Hall et al.: "Coherent Light Emission from GaAs Junctions," Physical Review Letters, vol. 9, No. 9, Nov. 1, 1962, pp. 366–368.

Keyes et al.: "Recombination Radiation Emitted by Gallium Arsenide," Proc. I.R.E., vol. 50, No. 8, August 1962, pp. 1822 and 1823.

Nasledov et al.: "Recombination Radiation of Gallium Arsenide," Soviet Physics Solid State, vol. 4, No. 4, October 1962, pp. 782–784 (translation from Fizika Tverdogo Tela, vol. 4, No. 4, April 1962, pp. 1062–1065; in Russian).

Quist et al.: "Semiconductor Maser of GaAs," Applied Physics Letters, vol. 1, No. 4, Dec. 1, 1962, pp. 91 and 92.

Weisberg et al.: "Materials Research on GaAs and InP," in Properties of Elemental and Compound Semiconductors, Interscience, New York, 1960, page 49 relied on.

JEWELL H. PEDERSEN, *Primary Examiner.*

FREDERICK M. STRADER, *Examiner.*

J. L. CHASKIN, R. L. WIBERT, *Assistant Examiners.*